3,549,326
SPECTROCHEMICAL ANALYSIS WITH WATER VAPOR ADDED
Ralph L. Dahlquist and James L. Jones, Santa Barbara, Calif., assignors to Applied Research Laboratories, Inc., Sunland, Calif., a corporation of Delaware
No Drawing. Filed July 3, 1968, Ser. No. 742,148
Int. Cl. G01n 21/00
U.S. Cl. 23—230     7 Claims

ABSTRACT OF THE DISCLOSURE

The addition of water vapor to the atmosphere in which a material to be spectrochemically analyzed is nebulized improves the stability and sensitivity of analysis for several analytes, particularly those such as carbon, sulfur, and many refractory metals that react with water at elevated temperatures to form gaseous or relatively fine and light reaction products. Interelement effects also are found to be reduced. The water vapor is added in amounts of fifty parts per million by volume or more.

BRIEF SUMMARY

This invention relates to a novel method of spectrochemical analysis, and more particularly, to an improved method of obtaining samples of materials for analysis by nebulizing them at elevated temperatures in the presence of water vapor.

The quantitative determination of certain elements such as, for example, carbon has heretofore been a difficult and uncertain matter in spectrometric analysis by optical emission, atomic absorption, or atomic fluorescence, especially when the elements are present in only small proportions. So-called inter-element effects also present problems. For example, the presence of manganese in a specimen inhibits the determination of carbon, even though the manganese is present in a much smaller proportion than carbon.

According to the invention, it has now been found that the addition of fifty parts per million or more of water vapor to the atmosphere in which the material to be analyzed is nebulized at elevated temperatures to obtain a sample for excitation, and to the atmosphere in which the sample is excited very significantly enhances the sensitivity, accuracy, and precision of analysis for several elements, and also reduces adverse inter-element effects.

The amount of water vapor is preferably at least about fifty parts per million by volume based on the total atmosphere, which is usually constituted of a selected carrier gas. The upper limit is usually in the range of about nine hundred to about one thousand parts per million, and is set by the reactivity of water with the material to be analyzed, and by the effect of water on the operational factors of the nebulizing and analytical equipment. Excess water vapor may foul the surface of the material, or it may inhibit the electric arc if one is used in the nebulizing step or for exciting the material. Amounts in excess of nine hundred or a thousand parts per million may also cause undesirable condensation of water in the liquid state in various parts of the equipment, or may interfere with other operational factors, depending upon the type of analytical apparatus employed.

DETAILED DESCRIPTION

Most of the work from which the present invention arose, and by which its practical advantages have been demonstrated, was done by exciting material in a wall-stabilized electric arc plasma source of the kind described and claimed in the co-pending application of Ralph L. Dahlquist and James L. Jones, Ser. No. 737,633, filed June 17, 1968, and entitled "Capillary Arc Arrangement for Spectrochemical Analysis." In some cases, gases such as $CH_4$ were analyzed by feeding them directly into the source along with the carrier gas, typically argon. In other cases, solids were analyzed by first nebulizing them in a cathodic arc aerosol generator to form an aerosol in accordance with the method described and claimed in the co-pending application of Dahlquist et al., Ser. No. 737,252, filed May 20, 1968, and entitled "Method of and Apparatus for Generating Aerosols by Electric Arc." The aerosols were conducted to the plasma source and injected into it for analysis.

In previous work, it was found to be very difficult to obtain consistent readings, especially for carbon, and in certain cases such as when the material to be analyzed included small proportions of manganese, signals characteristic of carbon were indistinguishable from normal noise.

With the addition of water vapor, the analytic results were bery much improved. In the case of analyzing gases, the water vapor was added to the working gas fed to the electric arc plasma source, that is, the gas such as argon used to sustain the arc. In the case of materials nebulized by the electric arc, the water vapor was fed to the gas used to sustain the nebulizing arc, which gas also constituted the working gas for sustaining the electric arc in the plasma source.

The reasons for the improvements achieved in the practice of the invention are not clearly understood. It is presently believed, however, that two principal effects are probably involved. First, the water vapor appears to have an effect on the analytical plasma, possibly tending to regulate and to stabilize its temperature due to dissociation and recombination of water molecules in the plasma. This is suggested by the increase in the characteristic carbon signals noted in the analysis of $CH_4$ for carbon. It was found that the carbon signal was approximately doubled by adding from six hundred to one thousand parts per million of water vapor to the carrier gas (argon) relative to the signal obtainable using dessicated carrier gas.

Second, water reacts with many elements at elevated temperatures to form volatile reaction products, or very finely divided reaction products of low density. When the material to be analyzed is nebulized at an elevated temperature in the presence of water, the effective extraction of these elements is greatly enhanced, because the reaction products tend to remain entrained with, or suspended in the carrier gas, and are delivered with relatively little diminution to the excitation device. In the absence of water vapor, some 80% to 90% of the solids of an aerosol may be lost by settling out during transport from the point of production to the excitation plasma. When water vapor is used, this loss is avoided for the specified elements, and their actual concentrations are correspondingly increased in the aerosol delivered to the excitation plasma.

The effect is particularly advantageous in the cases of carbon, sulfur, and many refractory metals. Carbon and sulfur react to form gaseous oxides. Many refractory metals react to form light oxides that appear as a thin smoke.

Thus, the inclusion of water vapor in the nebulizing step, that is, in the extraction of the sample from the material to be analyzed, provides a large increase in the quantity of certain analytes that can be delivered to the excitation zone. This effect is then multiplied by the effect of the water vapor upon the exciting plasma itself to enable a large increase in sensitivity and precision of analysis.

Certain inter-element effects have been found to be significantly reduced, and in some cases almost completely eliminated by the practice of the invention. For example, in the absence of water vapor in the analysis of steel, when manganese was present in proportions of 0.1% or greater, the signal from carbon was indistinguishable from the background noise regardless of carbon concentration. With the addition of six hundred parts per million of water vapor, the signals from carbon were at most 20% reduced by the presence of manganese in concentrations of up to 0.5% relative to the signals obtained in the absence of manganese. With about nine hundred parts per million of water vapor, the carbon signals were, for all practical purposes, the same whether manganese was present in the steel or not.

Empirical results have also shown that, in the practice of the invention, the characteristic radiation produced in the excitation zone is proportional to the concentration of the selected analyte affected by the water vapor through a wide range of concentrations of the analyte. Calibration is thus simplified.

In addition, accuracy is improved, because the effects of small, variable quantities of water vapor that are very difficult or impossible to eliminate are overcome. It has been found that heretofore in attempts to work in a dry atmosphere, fairly large variations in successive analyses of the same material were encountered, and it is believed these variations were probably due to the accidental presence of water vapor in the system in fairly small but variable quantities. The effect is overcome in the practice of the invention by intentionally introducing a relatively large quantity of water vapor, "swamping" any effect of variations in the quantities of water vapor present in the system by accident.

Argon is the most commonly used carrier gas in analyses of the kind to which the present invention pertains. As generally available commercially, it includes about five to about ten parts per million of water vapor. Also, an additional few parts per million of water vapor are usually unavoidably introduced into the analytical system. In the practice of the invention, water vapor is intentionally added in quantities greater by several times than the variations in the quantities of water vapor otherwise present. The minimum quantity for this purpose is presently thought to be about fifty parts per million, about five times the amount ordinarily present in commercial argon.

For optimum results, substantially greater quantities may be required depending on the identity of the particular analyte sought, its concentration in the material to be analyzed, the degree of enhancement desired in the analytical signal, and whether inter-element effects need to be overcome. In cases where the only concern is to improve stability, the minimum quantity of water vapor may be fully effective. In cases where enhancement of the signal is desired, and also reduction of inter-element effects, much larger quantities of water vapor are usually required. When analyzing for carbon in steel, for example, about three hundred parts per million of water vapor provides adequate enhancement of the analytical signal in the absence of adverse inter-element effects. Optimum reduction of the inter-element effects from manganese, however, requires about nine hundred parts per million of water vapor.

In general, there appears to be little to be gained by trying to minimize the amount of water vapor, and in most cases optimum results may be insured by using water vapor in fairly large amounts, say between about six hundred and nine hundred parts per million, as limited primarily by fouling of the surface of the material to be analyzed.

What is claimed is:

1. In a method of spectrochemical analysis for the analytes carbon, sulfur, and refractory metals wherein a material to be analyzed is nebulized in an atmosphere consisting primarily of a noble gas at an elevated temperature to obtain a gas supportable sample of the maeerial for excitation, the improvement comprising the step of adjusting the concentration of water vapor in the atmosphere to a value greater than about fifty parts per million by volume.

2. Method according to claim 1 wherein the concentration of water vapor is between about fifty and about nine hundred parts per million by volume.

3. Method according to claim 1 wherein the atmosphere consists essentially of argon and water vapor.

4. Method according to claim 1 wherein the material to be analyzed is nebulized by an electric arc.

5. Method according to claim 1 wherein the material is nebulized at a temperature at which the analyte reacts with water to form a gaseous reaction product.

6. Method according to claim 1 wherein the material is nebulized at a temperature at which the analyte reacts with water to form a finely divided solid reaction product that settles out of the controllable atmosphere at a slower rate than unreacted particles of the sample.

7. Method of analyzing a material to determine the concentration of carbon in it comprising nebulizing a portion of the material at an elevated temperature in an atmosphere consisting primarily of a noble gas to obtain a sample of the material in the form of an aerosol, adjusting the concentration of water vapor in the atmosphere to a value between about three hundred and about nine hundred parts per million by volume, and exciting the sample for spectrochemical analysis.

References Cited
UNITED STATES PATENTS

| | | | |
|---|---|---|---|
| 3,007,367 | 11/1961 | Rich | 356—37 |
| 3,458,258 | 7/1969 | Krugers | 356—36 |

MORRIS O. WOLK, Primary Examiner

S. MARANTZ, Assistant Examiner

U.S. Cl. X.R.

356—36